United States Patent [19]

Candlin et al.

[11] Patent Number: 4,629,771
[45] Date of Patent: Dec. 16, 1986

[54] PROCESS FOR POLYMERIZING OLEFINS WITH A SPRAY-DRIED CATALYST

[75] Inventors: John P. Candlin, Aston; Anthony D. Caunt, Welwyn Garden City; John W. Kelland, Luton; Peter L. Law, Great Shelford, all of England

[73] Assignee: Imperial Chemical Industries, plc, London, England

[21] Appl. No.: 525,482

[22] Filed: Aug. 22, 1983

Related U.S. Application Data

[62] Division of Ser. No. 242,528, Mar. 11, 1981, Pat. No. 4,424,138.

[30] Foreign Application Priority Data

Mar. 24, 1980 [GB] United Kingdom ............... 8009838
Dec. 18, 1981 [GB] United Kingdom ............... 8105020

[51] Int. Cl.$^4$ ........................... C08F 4/64; C08F 10/00
[52] U.S. Cl. ..................................... 526/125; 526/124; 526/129; 526/139; 526/140; 526/142; 526/156; 526/159; 526/903; 526/904
[58] Field of Search ............. 526/124, 125, 129, 156, 526/139, 140, 142, 90, 908, 909, 904, 159

[56] References Cited

U.S. PATENT DOCUMENTS

| | | | |
|---|---|---|---|
| 3,412,174 | 11/1968 | Kroll et al. | |
| 3,758,621 | 9/1973 | Morikawa et al. | |
| 3,953,414 | 4/1976 | Gaui et al. | |
| 3,989,881 | 11/1976 | Yamaguchi et al. | |
| 4,038,295 | 7/1977 | Stern et al. | 260/409 |
| 4,111,835 | 9/1978 | Foschini et al. | |
| 4,124,532 | 11/1978 | Giannini et al. | 526/114 |
| 4,277,371 | 7/1981 | Caldo et al. | 252/429 C |
| 4,293,673 | 10/1981 | Hama et al. | 526/125 |
| 4,293,675 | 10/1981 | Hamer et al. | |
| 4,302,566 | 11/1981 | Karol et al. | 526/125 |
| 4,424,138 | 1/1984 | Candlin et al. | 526/125 |

FOREIGN PATENT DOCUMENTS

| | | |
|---|---|---|
| 0020818 | 1/1981 | European Pat. Off. |
| 1146287 | 11/1957 | France |
| 1248953 | 10/1971 | United Kingdom |
| 1434543 | 5/1976 | United Kingdom |
| 1527736 | 10/1978 | United Kingdom |
| 1536171 | 12/1978 | United Kingdom |
| 1554574 | 10/1979 | United Kingdom |

*Primary Examiner*—Edward J. Smith
*Attorney, Agent, or Firm*—Cushman, Darby & Cushman

[57] ABSTRACT

A suspension which comprises an inert liquid medium, a solid material, a transition metal compound and an agglomeration aid is dried using a spray-drying technique. The spray-drying is effected under conditions of temperature and pressure which are such as to cause evaporation of the liquid medium. The solid material is preferably in a finely-divided form and may consist essentially of a transition metal compound or may be a transition metal compound which is supported on a suitable solid inert matrix material. Alternatively, a suspension of a solid support material in a solution of a transition metal compound may be used. The agglomeration aid may be polystyrene dissolved in the inert liquid medium. The dried solid is obtained as an agglomerated solid which can be mixed with an organic compound of a non-transition metal to give an olefin polymerization catalyst system.

9 Claims, 5 Drawing Figures

PROCESS FOR POLYMERIZING OLEFINS WITH A SPRAY-DRIED CATALYST

This is a division of application Ser. No. 242,528 filed Mar. 11, 1981, now U.S. Pat. No. 4,424,138.

The present invention relates to the separation of a solid material from a liquid suspension and is particularly concerned with the separation of a component of a transition metal catalyst from an inert liquid medium in which the said component is suspended or dissolved.

Olefin monomers such as ethylene, propylene and the higher α-olefin monomers can be polymerised using the so-called "Ziegler-Natta" catalysts. The term "Ziegler-Natta" catalyst is generally used to mean a catalyst system obtained by mixing a compound of a transition metal of Groups IV to VIA of the Periodic Table with an organic compound of a non-transition metal of Groups IA to IIIA of the Periodic Table. In many of the catalyst systems, the compound of the transition metal is present either as a solid compound or as a compound on a solid support. For the polymerisation of propylene and the higher α-olefins, it is desirable that the catalyst is capable of producing a high yield of polymer relative to the amount of catalyst and also that the polymer obtained contains a high proportion of the desirable isotactic polymer. The catalyst systems originally described by Natta had a comparatively low activity and stereospecificity and in consequence it was necessary, at the end of the polymerisation process, to separate from the polymer catalyst residues and also to remove a comparatively large proportion of the undesirable atactic polymer. Catalyst systems which are now being developed have a considerably greater activity and with some of these catalysts it is no longer necessary to carry out a complex catalyst separation procedure or to remove atactic polymer. To simplify the polymerisation process further, it has been proposed to effect the polymerisation in the absence of any liquid medium using a gaseous monomer in contact with a solid phase comprising particles of catalyst and the formed polymer. In order to carry out such a polymerisation process, the particle form of the catalyst is also of importance. Some catalysts having high activity and stereospecificity cannot be used readily in a gas-phase polymerisation process since they have a particle form which is such as to give problems when effecting polymerisation in the gas phase, or which gives a polymer product having an undesirable particle form or particle size.

According to the present invention there is provided a process for the preparation of a solid particulate material containing a compound of a transition metal, which process comprises forming a suspension from an inert liquid medium and particles of at least one solid material, the suspension containing a compound of a transition metal which is either dissolved in the inert liquid medium or is present as a solid material suspended in the inert liquid medium, spray-drying the suspension and collecting a spray-dried solid material.

In the suspension, it is preferred that the particles of the at least one solid material are particles of the compound of the transition metal, or are particles which contain the compound of the transition metal. In addition to particles of, or containing, the compound of the transition metal, the suspension may also contain another solid material which does not contain the compound of the transition metal.

Thus, according to a preferred aspect of the present invention, particles of a solid material which is, or which contains, a compound of a transition metal are suspended in an inert liquid medium, optionally with particles of a solid material which does not contain a compound of a transition metal, the suspension is spray-dried and a spray-dried solid material is collected.

Alternatively, and less preferred, the suspension consists of a solution, in an inert liquid medium, of a compound of a transition metal, with particles of one or more solid materials suspended in the solution.

It is preferred that the suspension contains particles of only one solid material.

The inert liquid medium may be any liquid medium which does not have a deleterious effect on the characteristics of the spray-dried solid material when this is used as a component of an olefin polymerisation catalyst. Since olefin polymerisation catalysts can be obtained from solutions of transition metal compounds in polar solvents such as ethers and esters, it is possible to use such polar solvents, for example tetrahydrofuran, as the inert liquid medium for spray-drying, even though such liquids are not normally regarded as inert when used in an olefine polymerisation process.

If the compound of the transition metal is present as, or in, the particles of the at least one solid material, it is preferred that the inert liquid medium is an aliphatic, aromatic or cycloaliphatic hydrocarbon. Although aliphatic hydrocarbons such as pentane, hexane or heptane can be used as the inert liquid medium, we particularly prefer that the inert liquid medium is an aromatic hydrocarbon medium such as benzene, toluene or xylene.

In addition to the particles of the at least one solid material and the dissolved or suspended transition metal compound, the suspension may also contain a small amount of a material which assists in the agglomeration of the solid particles. This material, which is hereafter referred to as an "agglomeration aid", is conveniently present as a solution in the inert liquid medium.

The transition metal which is present in the compound of the transition metal is preferably a transition metal of one of Groups IVA to VIA of the Periodic Table and is especially a compound of titanium. The transition metal compound is typically a halide, especially a chloride.

The particles of the at least one solid material may consist essentially of a solid compound of the transition metal or may contain other materials in an appreciable quantity. Thus, if the solid material is a titanium chloride material, this may be essentially pure solid titanium trichloride or may be a titanium trichloride-containing material such as a product obtained by reducing titanium tetrachloride with a reducing agent such as aluminium metal, an organic aluminium compound or an organic magnesium compound. Alternatively, the titanium chloride material may be the product of contacting titanium tetrachloride with a support such as silica, alumina, magnesia, a mixture or complex of two or more thereof, or magnesium chloride. In addition to, or as an alternative to, the foregoing components, the transition metal compound may also include a Lewis Base compound such as an ether, an ester, an organic phosphorus compound or a sulphur-containing organic compound.

A Lewis Base compound may be incorporated into the transition metal compound at various stages during the production thereof. Thus, if the transition metal compound is the product obtained by the reduction of titanium tetrachloride by an organic compound of a non-transition metal, the product of the reduction may then be treated with a Lewis Base compound such as an ether. Alternatively, if the transition metal compound is the product of contacting titanium tetrachloride with a support, this supported compound may include a Lewis Base compound which has been incorporated into the support, or which has been added to the support as a mixture or complex with the transition metal compound, or which is added to the supported transition metal compound. Transition metal compounds supported on magnesium halides are described, inter alia, in British Patent specification Nos. 904 510, 1 271 411, 1 286 867, 1 310 547 and 1 527 736. Transition metal compounds supported on metal oxides such as alumina or silica are disclosed, inter alia, in published European patent application Nos. 14523 and 14524. Supported transition metal compounds of this type may be used in the process of the present invention.

An alternative technique of incorporating a Lewis Base compound into the transition metal compound is by grinding a solid transition metal compound in the presence of a Lewis Base compound. After the grinding process, the ground transition metal compound may be subjected to one or more extraction stages by washing with a suitable liquid medium. These washing stages may result in the ground and washed transition metal compound having a fine particulate form. The resultant finely-divided particles of a solid material, which solid material is, or contains, a compound of a transition metal, are particularly suitable for use in the process of the present invention.

Thus, according to a further aspect of the present invention there is provided a process which comprises grinding a solid transition metal compound in the presence of a Lewis Base compound, subjecting the ground transition metal compound to one or more extraction stages by washing with a suitable liquid medium, forming a suspension of the ground and washed solid in an inert liquid medium, spray-drying the said suspension and collecting a spray-dried solid material.

If the transition metal compound is a solid transition metal compound, this is preferably titanium trichloride, which term is used hereafter to include not only pure titanium trichloride but also materials which include titanium trichloride in association or complexed with other materials, for example, aluminium chloride or organo-aluminium halides. Titanium trichloride containing associated or complexed aluminium chloride may be obtained by the reduction of titanium tetrachloride with aluminium metal.

If the compound of a transition metal is dissolved in the inert liquid medium, the compound of a transition metal may be a simple compound such as titanium tetrachloride, dissolved in a hydrocarbon solvent such as hexane, heptane, a mixture of dodecane isomers, benzene or toluene. Alternatively, the compound of a transition metal may be present as a component of a complex material such as a complex of magnesium dichloride, titanium tetrachloride, and an organic Lewis Base compound, the complex material conveniently being dissolved in the same organic Lewis Base compound as is present in the complex material. Complex materials containing a divalent metal halide, a halide of a transition metal and an organic Lewis Base compound are described in U.S. Pat. No. 3,989,881 and British Patent Specification No. 1 502 567, both of which disclose the use of such complex materials as components of catalysts for the polymerisation of olefin monomers. A suspension of particles of the at least one solid material in solutions of such complex materials may be used in the process of the present invention.

If the transition metal compound, for example titanium tetrachloride, is dissolved in the inert liquid medium, for example a hydrocarbon solvent, the at least one solid material is preferably a material which can act as a support for an olefin polymerisation catalyst or catalyst component. Thus, the solid material can be silica, alumina, magnesia, a mixture or complex of two or more thereof, or magnesium chloride, or may be a polymeric material such as the polymer to be obtained, for example polyethylene or polypropylene.

The suspension which contains the particles of the at least one solid material, and which includes a dissolved or suspended transition metal compound, optionally may include an agglomeration aid, which is very desirably soluble in the inert liquid medium in which the particles of the solid material are suspended. The agglomeration aid should be such that, or should be used in an amount such that, it does not have an appreciable adverse effect on the activity and stereospecificity of an olefin polymerisation catalyst system which includes the spray-dried solid material which is the product of the present process. If the spray-dried solid material is subsequently to be suspended in a liquid medium, the agglomeration aid preferably should be such as to to least minimise dispersion of the spray-dried solid material into smaller particles in the presence of the liquid medium in which the solid is to be suspended.

The agglomeration aid may be polystyrene, polyvinylacetate, atactic polypropylene, or an AB block copolymer for example of t-butylstyrene-styrene. Alternatively, the agglomeration aid may be a sulphur-containing organic compound such as diphenyl sulphone, or may be aluminium chloride or may be a mixture or complex of a sulphur-containing organic compound and either aluminium chloride or titanium tetrachloride. It will be appreciated that not all agglomeration aids will be equally effective with all types of particles of the solid material. Some of the agglomeration aids, when added to the suspension of the particles of the solid material, may cause swelling of the solid. The use of an agglomeration aid during the spray-drying of the suspension can result in the spray-dried solid material being in the form of firmer agglomerates than a similar spray-dried solid material obtained without using an agglomeration aid. The amount of the agglomeration aid is preferably from 1% up to 10% molar relative to the transition metal present in the suspension. The suspension containing the agglomeration aid is spray-dried in the manner herein described.

The suspension which is to be spray-dried may contain a Lewis Base compound, which will typically be associated with the transition metal compound although, if the transition metal compound is dissolved in the inert liquid medium, the Lewis Base compound may be associated with the solid material, for example by using a solid material which previously has been ground with, or otherwise exposed to, the Lewis Base compound.

If a Lewis Base compound is present in the suspension, it is preferred that this is an organic Lewis Base compound which can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, an ortho-ester, a sulphide (thioether), an ester of a thiocarboxylic acid, (a thioester), a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an amine, which term is used in include simple amine compounds and also alkanolamines, cyclic amines such as pyridine or quinoline, and diamines such as tetramethylethylenediamine, or an organic phosphorus compound such as an organic phosphine, an organic phosphine oxide, an organic phosphite or an organic phosphate. The use of organic Lewis Base compounds is disclosed, inter alia, in British Patent Specification Nos. 803 198, 809 717, 880 998, 896 509, 920 118, 921 954, 933 236, 940 125, 966 025, 969 074, 971 248, 1 013 363, 1 017 977, 1 049 723, 1 122 010, 1 150 845, 1 208 815, 1 234 657, 1 324 173, 1 359 328, 1 383 207, 1 423 658, 1 423 659, 1 423 660, 1 495 031, 1 550 810, 1 553 291 and 1 554 574.

The preferred Lewis Base compound will be dependent on the transition metal compound, and any solid material which is present in the suspension in addition to the transition metal compound. Thus, using the solid material obtained by contacting, for example by grinding, magnesium dichloride with titanium tetrachloride, the Lewis Base compound is preferably an ester, particularly an aromatic ester such as ethyl benzoate. However, using a complex material such as those described in U.S. Pat. No. 3,989,881 and British Patent Specification No. 1 502 567, the Lewis Base compound is conveniently an ester or a cyclic ether such as tetrahydrofuran. Using a solid transition metal compound, particularly titanium trichloride, which has been ground with a Lewis Base compound, we particularly prefer to use an organic phosphorus compound or the sulphur-containing organic compounds which are disclosed in British Patent Specification No. 1 495 031.

The particles of the at least one solid material which are present in the suspension will typically have a particulate size of less than 10 microns, especially less than 5 microns.

The process of the present invention can be used with titanium trichloride materials obtained as described in British Patent Specification No. 1 554 574. More specifically, the particles of the at least one solid material can be obtained by grinding together titanium trichloride and aluminium chloride, adding to the ground material titanium tetrachloride and diphenyl sulphone or another specified sulphur-containing organic compound, grinding the mixture, and washing the ground material. The product obtained is typically a finely-divided solid. When this solid is used as a component of an olefin polymerisation catalyst, the catalyst has a high activity and stereospecificity but because of the fine particle size of the solid component, the catalyst is not particularly suitable for use in effecting polymerisation in the gas phase. A suspension of this finely-divided solid may be spray-dried in accordance with the process of the present invention.

Figure 1:
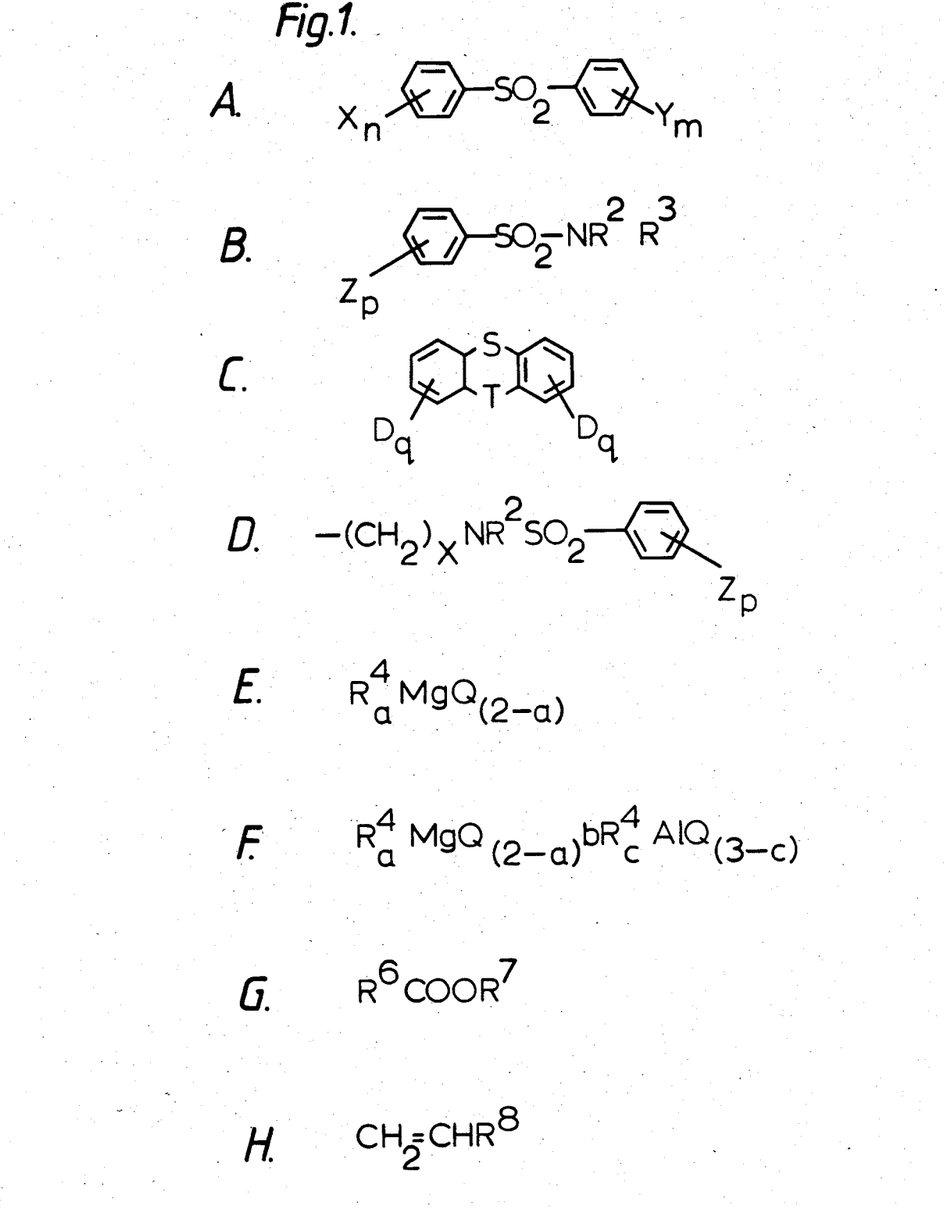
in FIG. 1, the formulae A to H represent compounds which may be used in the present invention.

Thus, as a further aspect of the present invention there is provided a process for the preparation of a transition metal composition which comprises grinding titanium trichloride, aluminium chloride and titanium tetrachloride in the presence of a sulphur-containing organic compound which is selected from compounds having one of the formulae (A), (B) or (C) in the accompanying formulae drawings, washing the ground solid with a liquid medium capable of either dissolving the sulphur-containing organic compound and one or both of aluminium chloride and titanium tetrachloride, or of dissolving a complex of the sulphur-containing organic compound and at least one of aluminium chloride or titanium tetrachloride, suspending the ground and washed solid in an inert liquid medium, spray-drying the suspension and collecting a titanium trichloride-containing spray-dried solid material.

In the formulae (A), (B) and (C) as set out in the attached formulae drawings, the significance of the symbols is as follows:

X, or each X, is, independently, a halogen atom, an alkyl, aryl, alkoxy, aryloxy, alkylthio, or arylthio group, or a group —NR$^1$R$^2$, or two groups X can, together with at least two of the carbon atoms of the phenyl group to which they are attached, form an unsaturated hydrocarbon ring;

Y, or each Y, is, independently, a halogen atom, an alkyl, aryl, alkoxy, aryloxy, alkylthio, or arylthio group, or a group —NR$^1$R$^2$, or two groups Y can, together with at least two of the carbon atoms of the phenyl group to which they are attached, form an unsaturated hydrocarbon ring; or a group X and a group Y may be replaced by a link between the two phenyl groups attached to the —SO$_2$— group, the linkage being either direct or through a group —O—, —CH$_2$—, —NR$^1$—, —S— or —CO—;

Z, or each Z, is, independently, a halogen atom, an alkyl, aryl, alkoxy, aryloxy, alkylthio, or arylthio group, or a group —NR$^1$R$^2$, or two groups Z can, together with at least two of the carbon atoms of the phenyl group to which they are attached, form an unsaturated hydrocarbon ring;

D, or each D, is, independently, a halogen atom, an alkyl, aryl, alkoxy, aryloxy, alkylthio, or arylthio group, or a group —NR$^1$R$^2$;

T is —S—, —O—, —NR$^2$— or —CO—;

R$^1$ is a hydrogen atom or a hydrocarbon radical;

R$^2$ is a hydrocarbon radical;

R$^3$ is a hydrocarbon radical or can be a group of the formula (D) in the accompanying formulae drawings;

n, m, p and q are each, independently, zero or an integer from 1 up to 5; and x is a positive integer.

In the foregoing procedure, the titanium trichloride is conveniently a material containing aluminium chloride, for example the material represented by the formula TiCl$_3\frac{1}{3}$AlCl$_3$. This titanium chloride is first ground with additional aluminium chloride, the ground product is then mixed with titanium tetrachloride and the sulphur-containing organic compound and grinding is then continued. The quantity of additional aluminium chloride is typically from 10% up to 80%, especially from 25% up to 60%, molar relative to the titanium trichloride. The amount of titanium tetrachloride added to the mixture is typically from 5% up to 50% molar relative to the titanium trichloride and is especially from 10% up to 20% molar. The quantity of the sulphur-containing organic compound which is added to the mixture is typically from 50% up to 100% molar relative to the titanium trichloride.

The ground material is then washed several times with a suitable liquid medium which is typically a hot aromatic solvent such as toluene at a temperature which is preferably between 80° C. and 120° C. The washing with the liquid medium is preferably repeated several times.

The washed solid is finally suspended in a suitable inert liquid medium which is conveniently a further quantity of the liquid medium used to effect the washing.

The suspension of the ground and washed material is spray-dried and the spray-drying can be effected using conventional spray-drying techniques. Thus, the suspension is passed through a suitable atomizer which creates a spray or dispersion of droplets of the suspension, a stream of a hot gas is arranged to contact the droplets and cause evaporation of the liquid medium and the solid product which separates is collected. Suitable atomizers for producing the droplets of the suspension include nozzle atomizers and spinning disc atomizers.

Since, as is well known, the transition metal components of an olefin polymerisation catalyst are sensitive to oxidation, the spray-drying procedure is effected in an essentially oxygen- and water vapour-free medium. The preferred gaseous medium for effecting the spray-drying is nitrogen having a high degree of purity, but any other gaseous medium which will have no deleterious effect on the transition metal component may be used. Thus, alternative gaseous materials which may be used include hydrogen and the inert gases such as argon or helium.

To prevent the ingress of oxygen-containing materials into the spray-drying apparatus, it is preferred to operate at a slightly elevated pressure, for example at about 1.2 kg/cm$^2$ absolute. Although the temperature may be below the boiling temperature of the liquid medium under the pressure conditions which exist within the spray-drying apparatus, the temperature should be such as to cause sufficient evaporation of the liquid medium to dry at least the outer surface of the droplets before they reach the wall, or discharge point, of the spray-drying apparatus.

It is preferred that the temperature at which the spray-drying is effected is relatively low in order to avoid affecting deleteriously those characteristics of the spray-dried solid material which are of importance for a component of an olefin polymerisation catalyst. Hence, it is preferred that the temperature of the hot gas which is introduced into the spray-drying apparatus does not exceed about 200° C. and is such that the temperature of the droplets, or the spray-dried material, does not exceed 150° C., and preferably the maximum temperature of the droplets, or the spray-dried material is in the range between 80° C. and 130° C. It will be appreciated that the temperature of the hot gas will be at least equal to the maximum temperature attained by the droplets or spray-dried material.

The hot gas may be arranged to pass in a countercurrent flow to the droplets of the suspension but typically a cocurrent flow of the hot gas and the suspension is used. Using a cocurrent flow, the atomizer is typically located at the top of the spray-drying apparatus and the hot gas is introduced into the top of the apparatus and is removed from near the bottom of the apparatus.

Some of the spray-dried solid collects at the bottom of the apparatus, from which it may be removed, preferably continuously by suitable means such as a star feeder valve, a screw conveyor, or in the hot gas stream.

The hot gas, which has been cooled by its passage through the spray-drying apparatus may be removed separately from the spray-drying apparatus. The hot gas may be passed through a cyclone to remove entrained solid, and the solid removed in the cyclone may be added to any which is separately removed from the spray-drying apparatus. The vapour of the inert liquid medium which is present in the hot gas is desirably condensed in a suitable condenser, and the condensed inert liquid medium can be re-used. The gas may then be reheated and recirculated to the spray-drying apparatus.

The conditions of spray-drying can be adjusted to give any desired particle size and preferred particle sizes for the final spray-dried material are in the range from 20 up to 100 microns, particularly between 40 and 80 microns, for example 50 microns.

Since the spray-dried solid material can be used as a component of an olefin polymerisation catalyst, it is desirable that the form of the spray-dried solid material should be such that the olefin polymer obtained has a satisfactory particle form. More specifically, the spray-drying conditions are preferably such that the spray-dried solid obtained, when used as a component of a catalyst to polymerise an olefin monomer in an amount of more than 1000 g of monomer polymerised for each millimole of the transition metal present in the catalyst system, gives a polymer product which is essentially free from lumps and fine polymer. By "essentially free" we mean that the polymer contains not more than 10% by weight of lumps and not more than 10% by weight of fine polymer. It is preferred that the solid is such that the polymer contains less than 5% by weight, and especially less than 2% by weight, of each of lumps and fine polymer. By "lumps" we mean polymer particles one dimension of which is one cm or greater. By "fine polymer" we mean polymer particles having a maximum dimension of less than 75 microns.

The spray-dried solid material may be used together with an organic compound of a non-transition metal to give an olefin polymerisation catalyst system.

Thus, as a further aspect of the present invention there is provided an olefin polymerisation catalyst which is the product obtained by mixing together (1) a transition metal composition which is the product of spray-drying a suspension in accordance with the present invention; and (2) an organic compound of aluminium or of a metal of Group IIA of the Periodic Table or a complex of an organic compound of a metal of Group IA or Group IIA of the Periodic Table with an organic aluminium compound.

Component (2) of the catalyst can be a magnesium-containing compound of formula E or a magnesium-containing complex compound of formula F in the attached formula drawings, wherein:

each R$^4$, which may be the same or different, is a hydrocarbon radical;

each Q, which may be the same or different, is a group OR$^5$ or a halogen atom other than fluorine;

R$^5$ is a hydrocarbon radical or a substituted hydrocarbon radical;

a has a value of greater than 0 up to 2;

b has a value of greater than 0 up to 2; and c has a value of from 0 up to 3.

The groups R$^4$ are all typically alkyl groups and conveniently are alkyl groups containing from 1 up to 20 carbon atoms and especially 1 up to 6 carbon atoms. The value of a is preferably at least 0.5 and it is particularly preferred that a has a value of 2. The value of b is typically in the range 0.05 up to 1.0. The value of c is typically at least 1 and is preferably 3.

If the component (2) is a complex of a metal of Group IA with an organic aluminium compound, this compound may be of the type lithium aluminium tetraalkyl. It is preferred that the component (2) is an organic aluminium compound which may be, for example, an aluminium hydrocarbyl halide such as a dihydrocarbyl aluminium halide, an aluminium hydrocarbyl sulphate, or an aluminium hydrocarbyl hydrocarbyloxy but is preferably an aluminium trihydrocarbyl or a dihydrocarbyl aluminium hydride. The aluminium trihydrocarbyl is preferably an aluminium trialkyl in which the alkyl group contains from 1 up to 8 carbon atoms and is particularly an ethyl group.

Using an aluminium trihydrocarbyl compound as component (2), it is preferred that the catalyst system also includes a Lewis Base compound if the catalyst system is to be used to polymerise a higher olefin monomer such as propylene. The Lewis Base compound can be any Lewis Base compound of the type disclosed as being suitable for use in the suspension which is spray-dried and is preferably an organic Lewis Base compound.

Suitable Lewis Base compounds include esters of the formula G given in the attached formulae drawings.

In the formula G,

R$^6$ is a hydrocarbon radical which may be substituted with one or more halogen atoms and/or hydrocarbonoxy groups; and R$^7$ is a hydrogen radical which may be substituted by one or more halogen atoms.

The groups R$^6$ and R$^7$ may be the same or different and it is preferred that one, but not both, of the groups R$^6$ and R$^7$ includes an aryl group. The group R$^6$ is conveniently an optionally substituted alkyl or aryl group, for example a methyl, ethyl, or especially a phenyl, tolyl, methoxyphenyl or fluorophenyl group. The group R$^7$ is preferably an alkyl group containing up to 6 carbon atoms, for example an ethyl or a butyl group. It is particularly preferred that R$^6$ is an aryl or haloaryl group and R$^7$ is an alkyl group. Esters of formula G include ethyl benzoate and esters of anisic acid (4-methoxybenzoic acid) such as ethyl anisate.

In addition to, or instead of, the Lewis Base compounds, the catalyst system may also include a substituted or unsubstituted polyene, which may be an acyclic polyene such as 3-methylheptatriene(1,4,6), or a cyclic polyene such as cyclooctatriene, cyclooctatetraene, or cycloheptatriene or the alkyl- or alkoxy-substituted derivatives of such cyclic polyenes, tropylium salts or complexes, tropolone or tropone.

The proportions of components (1) and (2) of the catalyst system can be varied within a wide range as is well known to the skilled worker. The particular preferred proportions will be dependent on the type of materials used and the absolute concentrations of the components but in general we prefer that for each gramme atom of the transition metal which is present in component (1) of the catalyst system there is present at least one mole of component (2). The number of moles of component (2) for each gramme atom of the transition metal in component (1) may be as high as 1000 but conveniently does not exceed 500 and with some transition metal compositions may be not more than 25, for example from 5 up to 10.

When the catalyst system includes a Lewis Base component in addition to component (2), it is preferred that the Lewis Base compound is present in an amount of not more than one mole for each mole of component (2) and particularly from 0.1 up to 0.5 mole of the Lewis Base compound for each mole of the component (2). However, depending on the particular organic metal compound and Lewis Base compound, the proportion of the Lewis Base compound may need to be varied to achieve the optimum catalyst system.

If the catalyst system includes a polyene, it is preferred that the polyene is present in an amount of not more than one mole for each mole of component (2), and especially from 0.01 up to 0.20 mole for each mole of component (2). If the catalyst system includes both a Lewis Base component and a polyene, it is preferred that both of these materials are together present in an amount of not more than one mole for each mole of component (2).

Catalysts in accordance with the present invention can be used to polymerise or copolymerise olefin monomers.

Thus, as a further aspect of the present invention there is provided an olefin polymerisation process which comprises contacting, under polymerisation conditions, at least one olefin monomer with a catalyst in accordance with the present invention.

The olefin monomer which may be contacted with the catalyst system is one having the formula H as set out in the accompanying formulae drawings.

In the formula H,

R$^8$ is a hydrogen atom or an alkyl radical.

Thus, the olefin may be ethylene, propylene, butene-1, pentene-1, hexene-1, 4-methylpentene-1 or any other olefin which satisfies formula H. The olefin monomer is preferably one containing not more than 10 carbon atoms. The olefin monomers may be homopolymerised or may be copolymerised together. If propylene is copolymerised it is preferred to effect the copolymerisation with ethylene, conveniently using a sequential copolymerisation process as is described in British Pat. Nos. 970 478; 970 479 and 1 014 944. If ethylene is being copolymerised using the process of the present invention, it is preferred to carry out the copolymerisation using a mixture of ethylene and the desired comonomer, for example butene-1 or hexene-1, wherein the mixture of monomers has essentially the same composition throughout the polymerisation process.

Component (1) of the catalyst may be mixed with the other component, or components, of the catalyst in the presence of the olefin monomer. If the catalyst includes a Lewis Base compound, it is preferred to premix the organic metal compound which is component (2) with the Lewis Base compound and then to mix this pre-mixture with the reaction product which is component (1).

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Patent Specification Nos. 1 111 493; 1 226 659 and 1 383 611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase may be effected using conditions which are such that the monomer is at a temperature and partial pressure which are close to the dew point temperature and pressure for that monomer, for example as described in more detail in British Patent Specification No. 1 532 445. Polymerisation in gas phase can be effected using any technique suitable for effecting a gas-solid reaction such as a fluidised-bed reactor system, a stirred-bed reactor system or a ribbon blender type of reactor.

Using the catalyst systems of the present invention, ethylene may be polymerised or copolymerised, for example with butene-1 as the comonomer, in a fluidised-bed reactor system to give a high yield of polymer. The fluidising gas is the gas mixture to be polymerised together with any hydrogen which is present as a chain transfer agent to control molecular weight. Thus, for the copolymerisation of ethylene and butene-1 to produce an ethylene copolymer having a density of less than about 940 kg/m$^3$, the gas composition is typically from 50 to 60 mole % ethylene, 15 to 25 mole % butene-1 with the remainder, apart from inert materials and impurities, being hydrogen.

Polymerisation may be effected either in a batch manner or on a continuous basis, and the catalyst components may be introduced into the polymerisation vessel separately or all the catalyst components may be mixed together before being introduced into the polymerisation reactor. If all of the catalyst components are pre-mixed, this pre-mixing is preferably effected in the presence of a monomer and such pre-mixing will result in at least some polymerisation of this monomer before the catalyst system is introduced into the polymerisation vessel. If the polymerisation is being carried out in the gas phase, the catalyst components may be added to the polymerisation reactor suspended in a stream of the gaseous monomer or monomer mixture.

The polymerisation can be effected in the presence of a chain transfer agent such as hydrogen or a zinc dialkyl, in order to control the molecular weight of the product formed. If hydrogen is used as the chain transfer agent in the polymerisation of propylene, it is conveniently used in an amount of from 0.01 up to 5.0%, particularly from 0.05 up to 2.0% molar relative to the monomer. When the monomer being polymerised is ethylene, or a mixture in which ethylene is a major polymerisable component (by moles), the amount of hydrogen used may be greater, for example, in the homopolymerisation of ethylene the reaction mixture may contain in excess of 50% molar of hydrogen, whereas if ethylene is being copolymerised, a proportion of hydrogen which is typically up to 35% molar is used. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° C. up to 85° C.

Polymerisation can be effected at any pressure which has been previously proposed for effecting the polymerisation of olefin monomers. However, although the polymerisation may be effected at pressures up to 3000 kg/cm$^2$, at which pressures the polymerisation temperature may be as high as 300° C., it is preferred to carry out the polymerisation at relatively low pressures and temperatures. Whilst the polymerisation may be effected at atmospheric pressure, it is preferred to use a slightly elevated pressure and thus it is preferred that the polymerisation is effected at a pressure of from 1 kg/cm$^2$ up to 50 kg/cm$^2$, preferably from 5 up to 30 kg/cm$^2$. The polymerisation temperature is preferably above ambient temperature and typically will not exceed 100° C.

It will be appreciated that the particle form of the polymer obtained is dependent upon, and hence is affected by, the particle form of the spray-dried solid material which is component (1) of the catalyst system. Hence, by controlling the spray-drying conditions, a polymer of a desired form may be obtained.

Figure 2:
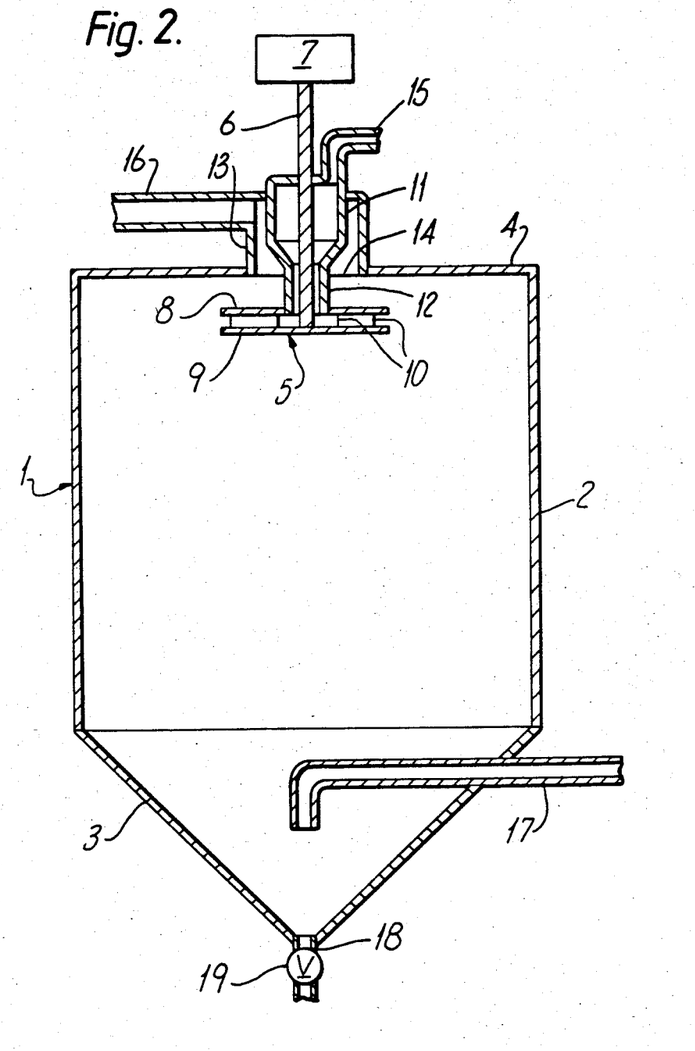
in FIG. 2 there is given a cross-sectional elevation of a typical spray-drying apparatus which can be used to perform the process of the present invention.

Apparatus suitable for use in the process of the present invention is shown diagrammatically in FIG. 2. A gas-tight spray-drying vessel 1 comprises an upper cylindrical section 2 and a lower, generally conical section 3. The upper section 2 is provided with a cover plate 4.

A disc 5 mounted on the end of an output shaft 6 of a high speed gear box/motor assembly 7 is located near the top of the vessel. The disc 5 consists of two plates 8 and 9 between which are secured a series of radial vanes 10. A chamber 11 surrounds the drive shaft 6 and extends to the upper plate 8 of the disc 5. The plate 8 is provided with a central opening indicated at 12.

A plenum chamber 13, which is mounted on the cover plate 4, surrounds the chamber 11. The plenum chamber 13, communicates with the vessel 1 through an annular opening 14 between a central opening in the cover plate 4 and the downward extension of the chamber 11.

A conduit 15 is connected to the chamber 11 and also to a source (not shown) of a suspension containing a transition metal compound. A conduit 16 is connected to the plenum chamber 13 and also to a source (not shown) of a heated inert gas.

Near the bottom of the vessel 1 is located a conduit 17 which passes out of vessel 1 through the side of the conical section 3. A conduit 18, in which is located a valve means 19, is connected to the bottom of the conical section 3 and is also connected to a hopper (not shown) for storing dry solid.

In operation, the disc 5 is rotated at a high speed in the range from 500 up to 25,000 rpm. A suspension containing a transition metal compound and an inert liquid medium, for example titanium trichloride in toluene, is passed through the conduit 15 and chamber 11 into the space between the plates 8 and 9 of the disc 5. The high speed of rotation of the disc 5, and the vanes 10, cause the suspension to pass the periphery of the disc 5 from which the suspension is flung off as a spray of droplets.

A hot inert gas is passed through the conduit 16, plenum chamber 13 and the annular opening 14 to flow round the rotating disc 5. The hot inert gas causes evaporation of the liquid medium from the droplets of the suspension.

The inert gas containing the vaporised liquid medium and some entrained spray-dried solid, passes out of the vessel 1 through the conduit 17. The major portion of the spray-dried solid collects at the bottom of the conical section 3 from which it is withdrawn through the conduit 18 by operation of the valve means 19.

The inert gas passing through the conduit 17 may be passed to a cyclone (not shown) to recover entrained solid, then to a condenser (not shown) to recover the liquid vapour and finally to a re-heater (not shown). The reheated inert gas is then recirculated to the conduit 16. The spray-dried solid passing through the conduit 18 is passed to a storage hopper (not shown).

The inert gas passed through the conduit 16 is conveniently nitrogen at a temperature of about 130° C.

The apparatus shown in FIG. 3 is essentially the same as that shown in FIG. 2 with the exception that the disc atomizer is replaced by an atomizer nozzle. In FIG. 3, the corresponding parts are indicated by the same reference numbers as in FIG. 2. An atomizer nozzle 20 is located within the phenum chamber 13. The atomizer nozzle 20 contains an inner conduit 15A and an outer conduit 21. The conduit 15A is a continuation of conduit 15, which is connected to a source (not shown) of a suspension containing a transition metal compound. Conduit 21 is connected to a source (not shown) of an inert gas. The conduits 15A and 21 are essentially coaxial and are tapered at their lower ends. The nozzle 20 is provided at its lower end with an orifice 22 formed by openings in both of conduits 15A and 21.

In operation, the gas flow through the conduit 21 draws the suspension through the conduits 15 and 15A. The gas and the suspension pass through the orifice 22 and form a spray of droplets. Hot inert gas which passes through conduit 16, plenum chamber 13 and opening 14, flows past the orifice 22 and causes evaporation of the liquid medium from the droplets of the suspension. The spray-dried solid is then recovered in the manner described in respect of the apparatus of FIG. 2.

The apparatus shown in FIG. 4 differs from that of FIG. 3 in the location of the atomizer nozzle. In FIG. 4, the atomizer nozzle 20 is located in the lower part of the vessel 1. The orifice 22 is arranged to point upwards. The vessel 1 is provided with a conical cover plate 23. The conduit 16 connects with the central portion of the cover plate 23.

In operation, the gas and the suspension form an upward spray from orifice 22 and the droplets formed first rise up the vessel 1, and then, under the influence of gravity and a counter-current flow of hot inert gas from the conduit 16, fall to the bottom of conical section 3 and are collected in the manner described in respect of the apparatus of FIG. 2.

In FIG. 3, there is a co-current flow of hot inert gas, and the spray from the nozzle whereas in FIG. 4, there is a counter-current flow of hot inert gas and the spray from the nozzle.

In FIG. 5, a storage vessel 24 is connected to the conduit 15. The conduit 18 passes to storage vessel 28 for the spray-dried solid. The conduit 17 passes to a cyclone 25, which is provided with a bottom exit conduit 26 provided with a valve 27. The conduit 26 is connected to the storage vessel 28. A vapour conduit 29 passes from the cyclone 25 to scrubber-condenser 30 having a spray head 31 located in the upper region. A conduit 32 passes from the base of scrubber-condenser 30 to a collection pot 33, having an overflow conduit 34 to a liquid storage vessel 35. From the base of the pot 33, a conduit 36 is connected to a pump 37, which in turn is connected to a conduit 38 which leads to a heat exchanger 39. A conduit 40 connects heat exchanger 39 to the spray head 31. A recycle conduit 41 connects scrubber-condenser 30 to a fan 42. A conduit 43 from the fan 42 is connected to a heat exchanger 44, to which is also connected the conduit 16 from the spray-drying vessel 1. A make-up conduit 45 is connected to conduit 43 and also to a storage vessel 46 for the inert gas.

In operation of the apparatus shown in FIG. 5, the suspension to be spray-dried is stored in the vessel 24 and passed at a desired rate through the conduit 15 to a spraying-device located within the plenum chamber 13 at the top of the spray-drying vessel 1. In the vessel 1, spray-drying occurs as described with reference to FIG. 2. Spray-dried solid which collects at the bottom of the vessel 1 is passed through the conduit 18 directly to the storage vessel 28.

The gas mixture passing through conduit 17 is transferred to the cyclone 25 in which the entrained solid is separated from the gas. The solid collects at the bottom of the cyclone 25 from which it is removed through the conduit 26 by operation of the valve 27. The solid from the cyclone 25 is also passed to the storage vessel 28.

The gas, which still contains the vaporised liquid medium, passes through vapour conduit 29 to scrubber-condenser 30. A spray of a cold liquid, which is the same as the liquid medium in the suspension, is injected into a scrubber-condenser 30 through the spray head 31 to cause condensation of the vaporised liquid medium and to entrain any residual solid particles not previously removed. Liquid passes from the bottom of scrubber-condenser 30 through conduit 32 to the pot 33. Excess liquid is removed through overflow conduit 34. The rest of the liquid is recycled through conduit 36, pump 37 and conduit 38 to heat exchange 39 where it is cooled and returned through conduit 40 to the spray head 31. The liquid in the vessel 35 may be used, with or without a subsequent purification step, to prepare a further quantity of a suspension for spray-drying.

Gas, essentially free of liquid vapour, is removed from the scrubber-condenser 30 through conduit 41, fan 42 and conduit 43 to the heat exchanger 44 in which the gas is heated and returned to the vessel 1 through the conduit 16. To replace gas which is lost from the system, a make-up quantity of the inert gas is introduced into the conduit 43 from storage vessel 46 through the conduit 45.

It will be appreciated that, if an atomizer nozzle is used, as described with reference to FIG. 3 or FIG. 4, a further conduit will be provided to connect storage vessel 46 to the atomizer nozzle.

Other alternative arrangements will be apparent to the skilled worker and these alternative arrangements may be used without departing from the scope of the present invention as defined herein.

Various aspects of the present invention will now be described with reference to the following Examples which are illustrative of the invention. In the Examples, all operations are effected under an atmosphere of nitrogen unless otherwise indicated. All the glass apparatus was dried in air oven at 120° C. for at least one hour and purged with nitrogen before use.

PREPARATION OF TITANIUM TRICHLORIDE SUSPENSION (A) Milling Stage

A Siebtechnik SM 50 Vibromill having a total volume of about 165 liters and containing 570 kg of steel balls of 25.4 mm diameter was sealed, evacuated to a pressure of 0.2 mm of mercury, and purged with nitrogen, to give a nitrogen atmosphere in the mill. A mixture of water and ethylene glycol at 0° C. was passed through the jacket of the mill. 12.01 kg of titanium trichloride (Stauffer-TiCl$_3$-AA of the approximate formula TiCl$_3$0.33AlCl$_3$) were introduced as a free-flowing powder into the mill, and then 2.95 kg of aluminium chloride (0.50 mole for each mole of TiCl$_3$ present in the Stauffer-TiCl$_3$-AA) were added. The mill was vibrated for 24 hours using a frequency of 1500 oscillations per minute and an amplitude of 2 mm, whilst continuing to pass the mixture of water and ethylene glycol at 0° C. through the jacket of the mill. The vibration of the mill was stopped. 9.02 kg of diphenyl sulphone (0.70 mole for each mole of TiCl$_3$ present in the Stauffer-TiCl$_3$-AA) were added, the mixture was milled for 5 minutes and milling was then stopped. 650 cm$^3$ of titanium tetrachloride (0.10 mole for each mole of TiCl$_3$ present in the Stauffer-TiCl$_3$-AA) were added to the contents of the mill and milling was continued for a further 24 hours whilst passing the mixture of water and ethylene glycol at 0° C. through the jacket of the mill.

At the end of the milling, the titanium trichloride product was removed from the mill by inverting the mill, vibrating the inverted mill and collecting the solid product under nitrogen.

(B) Washing Stage

A sample (1.1 kg) of the milled product from stage (A) was transferred to a 6 liter, jacketted glass vessel which was provided with a stirrer. Five liters of degassed toluene were added to the glass vessel, the mixture was stirred and the resulting suspension was heated to 100° C. The suspension was maintained at 100° C. for one hour and then heating and stirring were terminated and the solid was allowed to settle. The supernatant liquid was syphoned off from the settled solid.

The whole process was repeated four more times, each time using a sufficient quantity of degassed toluene to fill the vessel to the six liter mark on the vessel. After the final wash and removal of the wash liquid, a concentrated suspension remained.

Preparation of Suspension I

A concentrated suspension obtained by stages (A) and (B) was once more diluted to a total volume of six liters by the addition of degassed toluene. To the suspension was added solid diphenylsulphone in a quantity of 10% molar with respect to the titanium trichloride content of the suspension. The suspension was stirred and heated up to 70° C. over a period of 40 minutes. The temperature was maintained at 70° C. for one hour and stirring was then terminated. The solid particles were finely dispersed and did not settle even when the stirring had been terminated.

The procedure described was repeated with several samples and these were then combined to give a total volume of 15 liters of a suspension containing about 10% by weight of solid, which is hereafter referred to as suspension I.

Preparation of Suspension II

A sufficient number of concentrated suspensions, obtained by repeating stages (A) and (B), were combined to give a total volume of 15 liters of a suspension containing about 30% by weight of solid. This suspension will be referred to as hereafter as suspension II.

Preparation of Suspension III

The procedure described for the production of suspension II was repeated to obtain suspension III.

Preparation of Suspension IV

The procedure described for the production of suspension II was repeated to obtain 15 liters of a concentrated suspension.

A solution of polystyrene in toluene as prepared by adding 40 g of high molecular weight polystyrene (obtainable from BP Chemicals Limited) to 250 cm$^3$ of toluene and heating the mixture, in air, to about 65° C. for a period of time (about 10 minutes) sufficient for the polystyrene to be dissolved in the toluene. Nitrogen gas was passed through the solution to sparge dissolved air and the solution was then maintained under a nitrogen atmosphere.

The polystyrene solution was added to the concentrated suspension in an amount sufficient to provide 1% by weight of polystyrene relative to the solid content of the concentrated suspension. The suspension obtained will be referred to as hereafter as suspension IV.

EXAMPLES 1 TO 4

Suspensions I to IV were spray dried using spray-drying apparatus essentially as described with referred to FIG. 2. The spray-drying vessel had a diameter of 2.2 m, a cylindrical height of 1.95 m and a 60° cone.

The circulating gas was nitrogen which was pre-heated to about 137° C. before entering the spray-drying vessel. The rate of supply of nitrogen was about 600 kg per hour.

The suspension were not pre-heated and hence were at ambient temperature on being fed to the spray-drying vessel.

The rate of rotation of the atomizer disc was varied and also the time over which the suspension was fed to the spray-drying vessel. Details of these variations are set out in Table 1, together with the mean particle size of the spray-dried product.

TABLE 1

| Example | Suspension | Time (mins) | Spin Speed (rpm) | Particle Size (microns) |
|---|---|---|---|---|
| 1 | I | 15 | 24000 | 15 |
| 2 | II | 16 | 18000 | 15 |
| 3 | III | 13 | 24000 | 20 |
| 4 | IV | 14 | 24000 | 20 |

EXAMPLE 5

The product of Example 4 was used to effect the polymerisation of liquid propylene in the essential absence of any other liquids.

The propylene used for the polymerisation had been purified by passing gaseous propylene in turn through a column (7.6 cm in diameter, 0.9 m in length) containing 1.6 mm granules of Alcoa (Alcoa is a Registered Trade Mark) F1 alumina at 50°–60° C., and then through a similar column containing BTS catalyst (cupric oxide reduced to finely-divided metallic copper on a magnesium oxide support) at 40°–50° C., condensing the issue gas and passing the liquid propylene through four columns (all 7.6 cm in diameter; two of 0.9 m in length, two of 1.8 m in length) at 25° C., each containing 1.6 mm pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc) was unchanged at 0.3% and the level of unsaturated hydrocarbons (allene, methyl-acetylene etc) was unchanged at <1 ppm.

Polymerisation was carried out in a stainless steel autoclave, of total capacity 8 liters, which was fitted with a vertical anchor stirrer. The autoclave was heated to 70° C., evacuated, and the vacuum was released with propylene. The autoclave was then evacuated again and the procedure repeated 5 times. A solution of diethyl aluminium chloride (20 gm millimoles) in a heptane fraction was injected into the above-described autoclave containing propylene gas at 35° C. and 0.14 kg/cm$^2$ gauge. A suspension of 2 gram millimole of the product of Example 4 in 5 cm$^3$ of a pentamethyl-heptane fraction having a boiling point in the range 170° C. up to 180° C., was injected into the autoclave and then 5 liters of liquid propylene were added over a period of 40 minutes, the stirrer being operated at 150 rpm. This propylene addition was effected by forcing 5.5 liters of liquid propylene to transfer under applied nitrogen pressure from a burette at ambient temperature to the autoclave. During the addition of the liquid propylene, the autoclave was heated and attained a temperature of 70° C. when the addition of the propylene was complete. Hydrogen (200 gram millimoles) was then added and the temperature of the autoclave contents was maintained at 70° C. The hydrogen was commercially available hydrogen (99.99% pure) which had been further purified by passing through a column (8 inches by 4 feet in length) containing a molecular sieve material (Union Carbide 3A) at 20° C. The hydrogen was stored in the sieve column and drawn off as required. Polymerisation was allowed to proceed at a temperature of 70° C. and a pressure of about 30 kg/cm$^2$ gauge. More hydrogen (20 gram millimoles on each occasion) was added after 15, 30, 60 and 90 minutes from the time of the first hydrogen addition. After polymerisation for two hours, (measured from the time the addition of the liquid propylene had been completed), the autoclave was vented over a period of 10 minutes to remove unpolymerised propylene, and a free-flowing, pink powder was obtained.

The polymer obtained was in the form of spherical particles and had a flexural modulus (see note a) of 1.47 GN/m$^2$, a melt flow index (see note b) of 18.1 and the amount of residual titanium present in the polymer was found to be 54 parts per million by weight.

(a) The flexural modulus was measured using a cantilever beam apparatus as described in Polymer Age, March 1970, pages 57 and 58. The deformation of a test strip a 1% skin strain after 60 seconds at 23° C. and 50% relative humidity was measured. The test strip, which had dimensions of approximately 150×19×1.6 mm, was prepared in the following manner.

23 g of the polymer were mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil and pressed by means of an electric Tangye press at a temperature of 250° C. The pressing was pre-heated for a period of 6 minutes, under just enough pressure to make the polymer flow across the template, that is an applied force of about 1 tonne. After the pre-heat period, the applied force was raised to 15 tonnes in 5 tonne increments, degassing (that is releasing pressure) every 5 tonnes. After 2 minutes at 15 tonnes, the press was cooled by means of air and water for 10 minutes or until room temperature was reached. The plaque obtained was then cut into strips of dimensions 150×19×1.6 mm. Duplicate strips of each polymer were placed into an annealing oven at 130° C. and after 2 hours at this temperature the heat was switched off and the oven cooled to ambient temperature at 15° C. per hour.

(b) melt flow index is measured by ASTM Test Method D 1238/70, Condition N (190° C. and 10 kg).

EXAMPLE 6

Into a 91-liter stainless steel autoclave fitted with a stirrer were placed 35 kg of polypropylene powder having a flexural modulus of 1.49 GN/m$^2$ and 4.0% by weight of which was soluble in hot heptane as determined from the weight loss after Soxhlet extraction for 24 hours. The stirrer was rotated at 60 rpm and stirring was continued throughout the following procedure. The autoclave was purged at 70° C. with nitrogen, then evacuated to a pressure of 0.1 mm of mercury. Liquid propylene was added to the autoclave and vaporised to raise the pressure to 28 kg/cm$^2$ gauge. Hydrogen was added separately in the proportion of 1.5% by weight relative to the propylene.

A solution of diethyl aluminium chloride in the pentamethylheptane fraction and a 25% by weight suspension in the pentamethylheptane fraction of the product of Example 4, which had been stored for several weeks, were introduced into the autoclave in the molar proportions of 8:1 until polymerisation was observed to start. Liquid propylene was being introduced, and gaseous propylene vented off, whilst the catalyst was being added.

Once polymerisation had started, venting of the autoclave was stopped, liquid propylene at 20° C. was introduced into the autoclave at a rate of about 15 kg/hr and polypropylene, saturated with propylene, was intermittently withdrawn from the autoclave at a rate of about 10 to 12 kg of polymer per hour. The temperature and pressure were maintained at 70° C. and 28 kg/cm$^2$ gauge respectively. The diethyl aluminium chloride solution and the suspension were continuously introduced into the autoclave in the molar proportions of diethyl aluminium chloride to titanium trichloride of 8 to 1 and at a rate to maintain the rate of polymer production at the desired rate of 10 to 12 kg/hr of polymer.

Some properties of the polymer products removed at various times during the polymerisations are set out in Table 2.

TABLE 2

| Sample removed (hrs) | MFI (b) | Flex Mod. (GN/m²) (a) | Residual Ti (ppm by wt) |
|---|---|---|---|
| 19 | 20.6 | 1.19 | 75 |
| 21 | 20.6 | 1.14 | 70 |

Notes to Table 2
(a) is as defined in Example 5, note (a).
(b) MFI is melt flow index as defined in Example 5, note (b).

EXAMPLE 7

(A) Preparation of titanium trichloride suspension

The procedure of Example 2 of British Patent Specification No. 1 485 181 was repeated using Stauffer TiCl$_3$-AA and tri-n-butyl phosphine in a molar ratio of 4.2:1. The milled titanium trichloride product was suspended in purified n-heptane to give a suspension containing 40% by weight of the milled titanium trichloride product with respect to the total suspension.

(B) Spray drying of titanium trichloride suspension

Figure 3:
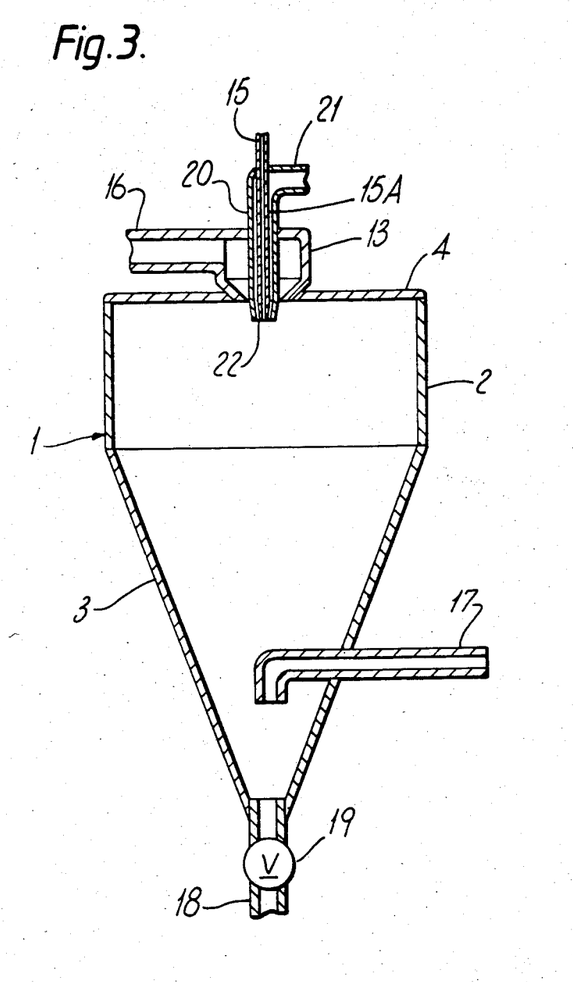
in FIG. 3 there is given a cross-sectional elevation of an alternative apparatus with an atomising nozzle.
Figure 4:
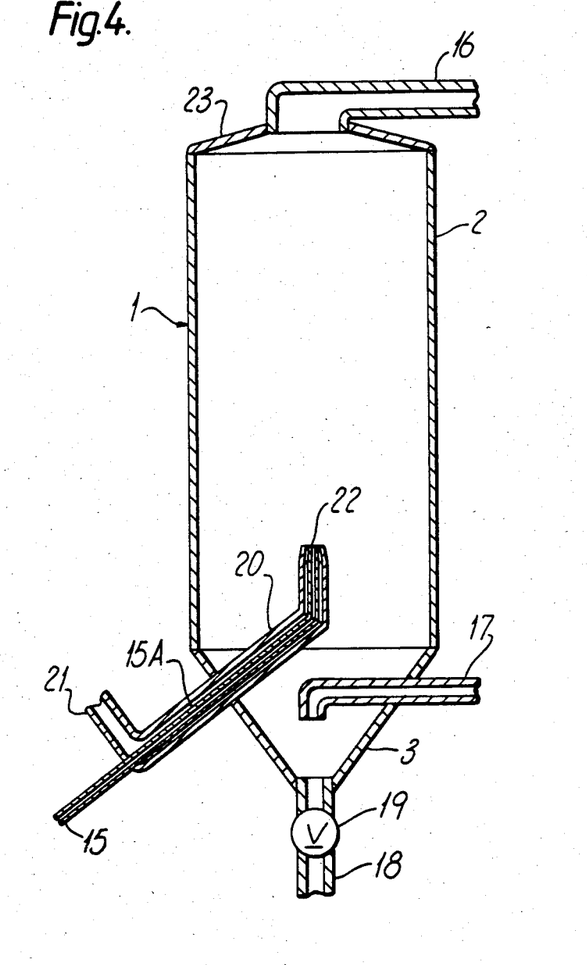
in FIG. 4 there is given a cross-sectional elevation of an alternative apparatus with an atomising nozzle located near the base; and in FIG. 5 there is given a flow diagram of an apparatus incorporating a spray dryer.
Figure 5:
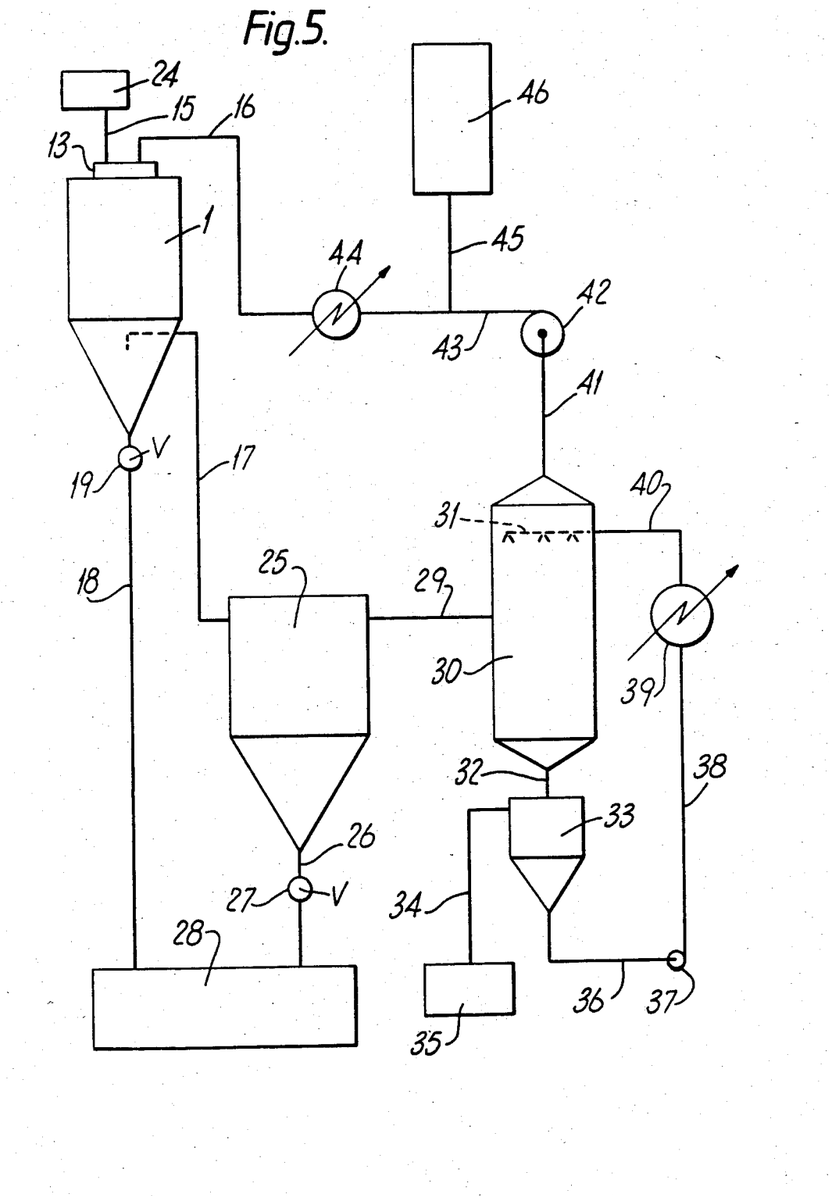

The suspension obtained in step (A) was spray dried using a glass laboratory scale spray drying apparatus similar to that described in FIG. 3. The spray drying apparatus had a diameter of 15 cm and a length of 0.7 meters, the conical section 3 was replaced by a generally hemispherical bottom section, the conduit 17 was omitted, the valve 19 in the conduit 18 was omitted and the conduit 18 was connected directly to a cyclone provided with a catch-pot in which the solid material was collected. The spray nozzle used was a ¼ JAU Automatic Air Atomizing Nozzle obtained from Spraying Systems Co. of the USA and having a 0.42 mm diameter nozzle.

Spraying was effected under nitrogen by passing a stream of nitrogen, preheated to a temperature of 140° to 150° C., through conduit 16 at a rate of 170 to 180 liters/minute. Nitrogen to a pressure of about 2.3 kg/cm² absolute was introduced into the spray nozzle. The suspension obtained in step (A) was fed from a stirred storage flask to the spray nozzle by the application of an excess nitrogen pressure of 5 cm of mercury to the storage flask.

EXAMPLE 8

Polymerisation was carried out in an 8 liter stainless steel autoclave.

3 liters of an aliphatic hydrocarbon diluent consisting essentially of dodecane isomers and having a boiling point in the range 170° C. to 185° C. was charged into the autoclave and degassed at 70° C. for 15 minutes at a pressure of 50 millimeters of mercury. Propylene was then admitted to the vessel in an amount to give a pressure of 1.1 kg/cm² absolute. The diluent was stirred and stirring was continued throughout the following procedures. 30 millimole of diethyl aluminium chloride, as a 25% by weight solution in the hydrocarbon diluent, were added to the autoclave. 2.5 millimole of the spray-dried titanium trichloride obtained in Example 7, were then added as a suspension of titanium trichloride in the hydrocarbon diluent.

The autoclave was maintained at 70° C. while propylene was passed into the autoclave to achieve a pressure of 11.5 kg/cm² absolute. 200 millimoles of hydrogen were then added. The pressure was maintained at 11.5 kg/cm² absolute by feeding propylene. After 4 hours, the propylene feed was terminated and the autoclave was vented to atmospheric pressure. The polymer suspension was passed into a receptacle and the polymer was filtered off in air. A sample of the polymer was washed with petroleum ether (boiling point 60°-80° C.) and the polymer was dried at 100° C. in a fluidised bed using nitrogen as the fluidising gas.

For comparative purposes, (Comparative Example A) a similar polymerisation was carried out using 3 millimoles of the milled titanium trichloride product of step A) of Example 7.

The polymer products were subjected to particle size analysis and the results obtained are set out in Table 3.

TABLE 3

| Sieve size (microns) | % Wt Retained Example 8 | % Wt Retained Comparative Example A |
|---|---|---|
| 425 | 5.6 | 6.9 |
| 355 | 2.7 | 1.5 |
| 300 | 3.4 | 2.3 |
| 212 | 23.0 | 8.0 |
| 180 | 7.3 | 3.3 |
| 150 | 16.3 | 7.3 |
| Base | 41.7 | 70.7 |

It will be observed that the polymer product of Example 8 contained a lower proportion of fine polymer (41.7% by weight) than the polymer product of Comparative Example A (70.7% by weight). Furthermore, the polymer product of Example 8 was a free flowing non-dusty material whereas the product of Comparative Example A had poor flow properties and was very dusty.

EXAMPLE 9

(A) Preparation of titanium trichloride suspension

A Siebtechnik SM6 Vibromill chamber having a total usable volume of about 1.5 liters and containing 180 stainless steel balls of 25.4 mm diameter was sealed, evacuated to a pressure of 0.2 mm of mercury, and purged with nitrogen, to give an atmosphere of nitrogen in the mill. 17.7 grammes of dried phenoxathiin (0.10 mole for each mole of titanium trichloride present in the Stauffer TiCl$_3$-AA) were introduced into the mill followed by 176.5 grammes of titanium trichloride (Stauffer TiCl$_3$-AA). The mill was cooled to 0° C. by passing a mixture of water and ethylene glycol at 0° C. through the jacket of the mill. The mill was vibrated for 24 hours using a frequency of 1500 oscillations per minute and an amplitude of 2 mm, whilst continuing to pass the mixture of water and ethylene glycol through the jacket.

After 24 hours milling, the titanium trichloride product was removed from the mill by inverting the mill, vibrating the inverted mill and collecting the solid product under nitrogen. 150 grammes of the milled product were suspended at ambient temperature, in 1500 cm³ of the aliphatic hydrocarbon diluent used in the polymerisation process of Example 8. The mixture was stirred and heated up to 100° C. On reaching 100° C., the stirrer and heater were switched off, the solid was allowed to settle and the supernatant liquid was decanted off at a temperature of about 75° C. This procedure was repeated a further four times.

After the fifth treatment a further quantity of the aliphatic hydrocarbon diluent was added to give a suspension containing 15% by weight of the titanium trichloride product.

(B) Spray drying of titanium trichloride suspension

The suspension obtained in step (A) was spray dried using the apparatus used for step (B) of Example 7 with the exception that the spray nozzle diameter was 0.52 mm diameter. The spraying conditions were as described for step (B) of Example 7 with the exception that the nitrogen was preheated to a temperature of 170° to 180° C. and was used at a rate of 185 liters/minute, and nitrogen was introduced through the spray nozzle at a pressure of 1.7 to 2.0 kg/cm$^2$.

The spray dried product was a free flowing powder.

We claim:

1. An olefin polymerisation process wherein at least one olefin monomer is contacted, under polymerisation conditions, with a polymerisation catalyst comprising:
    (1) a transition metal composition; and
    (2) an organic compound of aluminum or of a metal of Group IIA of the Periodic Table or a complex of an organic compound of a metal of Group IA or Group IIA of the Periodic Table with an organic aluminum compound wherein the transition metal composition which is component (1) of the polymerisation catalyst is the product obtained by forming a suspension from an inert liquid medium, particles of at least one solid material and a material which assists in the agglomeration of the solid particles, wherein the solid material is, or contains, a titanium halide selected from the group consisting of titanium trichloride, a solid titanium trichloride containing material and a product of contacting titanium tetrachloride with a support which is silica, alumina, magnesia, a mixture or complex of two or more thereof, or magnesium chloride, and the material which assists in the agglomeration of the solid particles is dissolved in the inert liquid medium, spray-drying the suspension and collecting a spray-dried solid material.

2. The process of claim 1 wherein ethylene or propylene is polymerised or copolymerised in the gas phase in the essential absence of a liquid phase.

3. The process of claim 1 wherein propylene is polymerised using a catalyst which also includes a Lewis Base compound.

4. The process of claim 1 wherein component (1) of the polymerisation catalyst is the product obtained by suspending particles of the solid material in an inert liquid medium which is an aliphatic, aromatic or cycloaliphatic hydrocarbon and in which is dissolved the material which assists in the agglomeration of the solid particles.

5. The process of claim 1 wherein component (1) of the polymerisation catalyst is the product obtained by forming a suspension which contains a Lewis Base compound which is an ether, an ester, an organic phosphorus compound or a sulphur-containing organic compound.

6. The process of claim 5 wherein component (1) of the polymerisation catalyst is the product obtained by using as the transition metal compound the product of grinding a solid titanium halide in the presence of the Lewis Base compound.

7. The process of claim 2 wherein component (1) of the polymerisation catalyst is the product obtained by suspending the solid particles in a solution of polystyrene in an aromatic hydrocarbon.

8. An olefin polymerisation process wherein at least one olefin monomer is contacted, under polymerisation conditions, with a polymerisation catalyst comprising:
    (1) a transition metal composition; and
    (2) an organic compound of aluminum or of a metal of Group IIA of the Periodic Table or a complex of an organic compound of a metal of Group IA or Ground IIA of the Periodic Table with an organic aluminum compound wherein the transition metal composition which is component (1) of the polymerisation catalyst is the product obtained by forming a suspension from an inert liquid hydrocarbon medium which is an aliphatic, aromatic or cycloaliphatic hydrocarbon, particles of at least one solid material, and a material which assists in the agglomeration of the solid particles, wherein the suspension contains a compound of a transition metal of Group IVA to VIA of the Periodic Table which compound is either dissolved in the inert liquid hydrocarbon medium or is present as a solid material suspended in the inert liquid hydrocarbon medium, and the material which assists in the agglomeration of the solid particles is dissolved in the inert liquid hydrocarbon medium, spray-drying the suspension and collecting a spray-dried solid material.

9. The process of claim 8 wherein component (1) of the polymerisation catalyst is the product using, as the compound of a transition metal, titanium tetrachloride which is dissolved in the solution in the inert liquid hydrocarbon medium of the material which assists in the agglomeration of the solid particles.

* * * * *